(12) United States Patent
Bhutani et al.

(10) Patent No.: US 8,193,466 B2
(45) Date of Patent: Jun. 5, 2012

(54) CAPACITIVE INPUT DEVICE WITH REMOVABLE COVER

(75) Inventors: Gurmeet Singh Bhutani, Punjab (IN); Shih-Wei Yang, Taoyuan (TW); Kuo-Hsiang Huang, Xizhi (TW)

(73) Assignee: Dell Products, LP, Round Rock, TX (US)

( * ) Notice: Subject to any disclaimer, the term of this patent is extended or adjusted under 35 U.S.C. 154(b) by 532 days.

(21) Appl. No.: 12/333,158

(22) Filed: Dec. 11, 2008

(65) Prior Publication Data
US 2010/0103609 A1 Apr. 29, 2010

(30) Foreign Application Priority Data
Oct. 24, 2008 (IN) .......................... 2430/DEL/2008

(51) Int. Cl.
*H01K 17/975* (2006.01)
(52) U.S. Cl. ...................... 200/600; 341/33; 361/679.17
(58) Field of Classification Search .................. 200/600; 341/33; 361/292, 299.3, 301.1
See application file for complete search history.

(56) References Cited

U.S. PATENT DOCUMENTS

| | | | | |
|---|---|---|---|---|
| 4,326,193 A | * | 4/1982 | Markley et al. | 345/168 |
| 5,808,861 A | * | 9/1998 | Nakajima et al. | 361/679.27 |
| 6,723,933 B2 | | 4/2004 | Haag et al. | |
| 2005/0040972 A1 | * | 2/2005 | Hamada et al. | 341/22 |
| 2005/0264539 A1 | * | 12/2005 | Nakamura | 345/173 |
| 2007/0139395 A1 | * | 6/2007 | Westerman et al. | 345/173 |
| 2007/0199804 A1 | * | 8/2007 | Joseph et al. | 200/5 A |

* cited by examiner

*Primary Examiner* — Vanessa Girardi
(74) *Attorney, Agent, or Firm* — Larson Newman, LLP

(57) ABSTRACT

An information handling system can include a base, a printed circuit board including a capacitive switch, and a cover. The printed circuit board can be attached to the base, and the cover can lie adjacent to the printed circuit board. The capacitive switch can be configured to change state when an object is close to the cover. The cover can be configured such that it can be detached from the remainder of the information handling system while the printed circuit board remains attached to the base. The configuration of the printed circuit board and cover can be particularly useful when maintaining a keyboard or a touch pad or when replacing the cover.

19 Claims, 6 Drawing Sheets

CAPACITIVE INPUT DEVICE WITH REMOVABLE COVER

CROSS REFERENCE TO RELATED APPLICATIONS

This application claims priority under 35 U.S.C. §119 to Indian Patent Application No. 2430/DEL/2008, entitled "INFORMATION HANDLING SYSTEM INCLUDING A CAPACITIVE STRIP AND A METHOD OF USING THE SAME," filed on Oct. 24, 2008.

FIELD OF THE DISCLOSURE

This disclosure relates generally to information handling systems, and more particularly to information handling systems including capacitive strips and methods of using the same.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system can include dashboard controls that use capacitive switches. The dashboard controls can be used in conjunction with a multimedia player within the information handling system. Such controls can include display brightness, volume, and media controls (e.g., play, rewind, etc.). FIG. 1 includes a simplified diagram of an information handling system 100. For simplicity, a display for the information handling system 100 is not illustrated. The information handling system 100 includes a base 120, which includes a keyboard 122, a touch pad 124, and a dashboard control strip 126. As illustrated in FIG. 1, the dashboard control strip 126 is detached from the base 120 and remains tethered to the base by a flexible flat cable 1264. FIG. 1 includes an illustration of the bottom side of the dashboard control strip 126 and includes a printed circuit board 1262 that is attached to the cover. The top side (not illustrated) of the dashboard control strip 126 includes icons corresponding to the dashboard controls.

FIG. 2 includes an illustration of a cross-sectional view of the dashboard control strip 126. The flexible flat cable 1264 is connected to the printed circuit board 1262 at the connector 204. A capacitive switch 202 is also coupled to the printed circuit board 1262. The dashboard control strip 126 also includes a cover 222 that is offset from the printed circuit board 1262 by pins 232, that help to establish an air gap 236 between the bottom surface of the cover and a top surface of the capacitive switch 202. The different parts of the dashboard control strip 126 are held together by screws 234.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION

Figure 1:
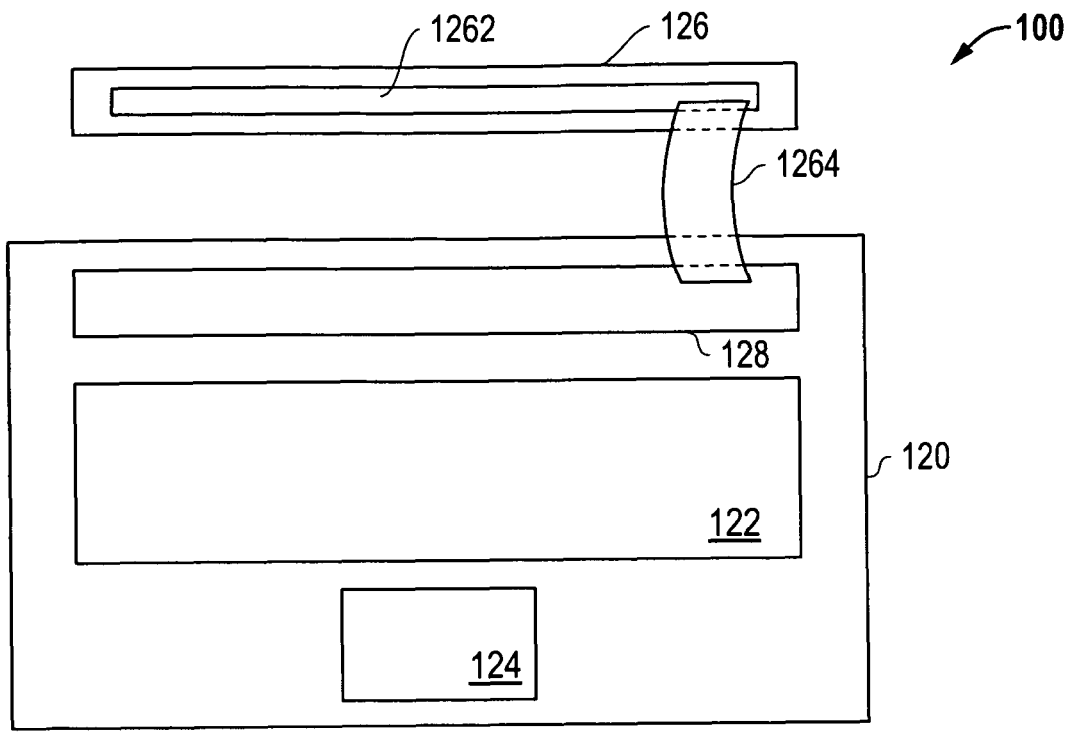
FIG. 1 includes an illustration of a base of an information handling system after a dashboard control strip has been detached from the base. (Prior art)
Figure 2:
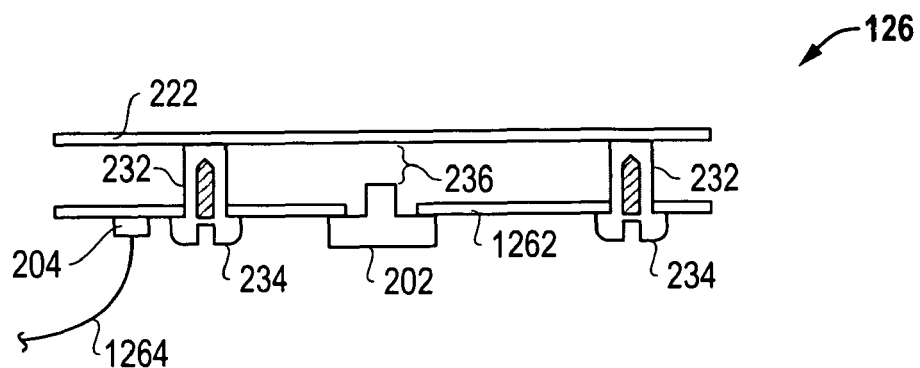
FIG. 2 includes an illustration of a side view of the dashboard control strip of FIG. 1. (Prior art)

An information handling system can include a base, a printed circuit board including a capacitive switch, and a cover. The printed circuit board can be attached to the base, and the cover can lie adjacent to the printed circuit board. In a particular embodiment, the combination of the printed circuit board and cover can be part of dashboard controls for the information handling system. The capacitive switch can be configured to change state when an object is close to the cover. The cover can be configured such that it can be detached from the remainder of the information handling system while the printed circuit board remains attached to the base. The configuration helps to make the information handling system more robust during maintenance procedures and helps to reduce costs during warranty repairs. More particularly, maintenance involving the keyboard or touch pad may only require removing of the cover, as opposed to the entire dashboard control strip as in the prior art. Thus, the likelihood of damaging the printed circuit board or the flat flexible cable during disassembly is significantly reduced and potentially substantially eliminated. Also, if the cover becomes scratched or otherwise damaged, only the cover, rather than the entire dashboard control strip, may be replaced.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

The systems and methods described herein are useful for and can be implemented using a wide variety of different IHSes. For purposes of this disclosure, an IHS can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. An IHS can include a processor capable of executing instructions in the form of machine-readable code stored within a memory. The IHS may or may not include a display dedicated to that particular IHS.

From a physical perspective, an IHS may be a portable IHS having a mass no greater than approximately 4 Kg, such as a laptop computer, a personal digital assistant (PDA), a mobile phone, a handheld media player or another portable electronic device. The IHS can include memory, one or more processing resources such as a central processing unit (CPU) or hardware or software control logic. Additional components of the IHS can include one or more storage devices, one or more communications ports for communicating with external devices, as well as various input and output (I/O) devices, such as a keyboard, a touchpad, and a video display. The IHS can also include one or more buses operable to transmit communications between the various hardware components.

Figure 3:
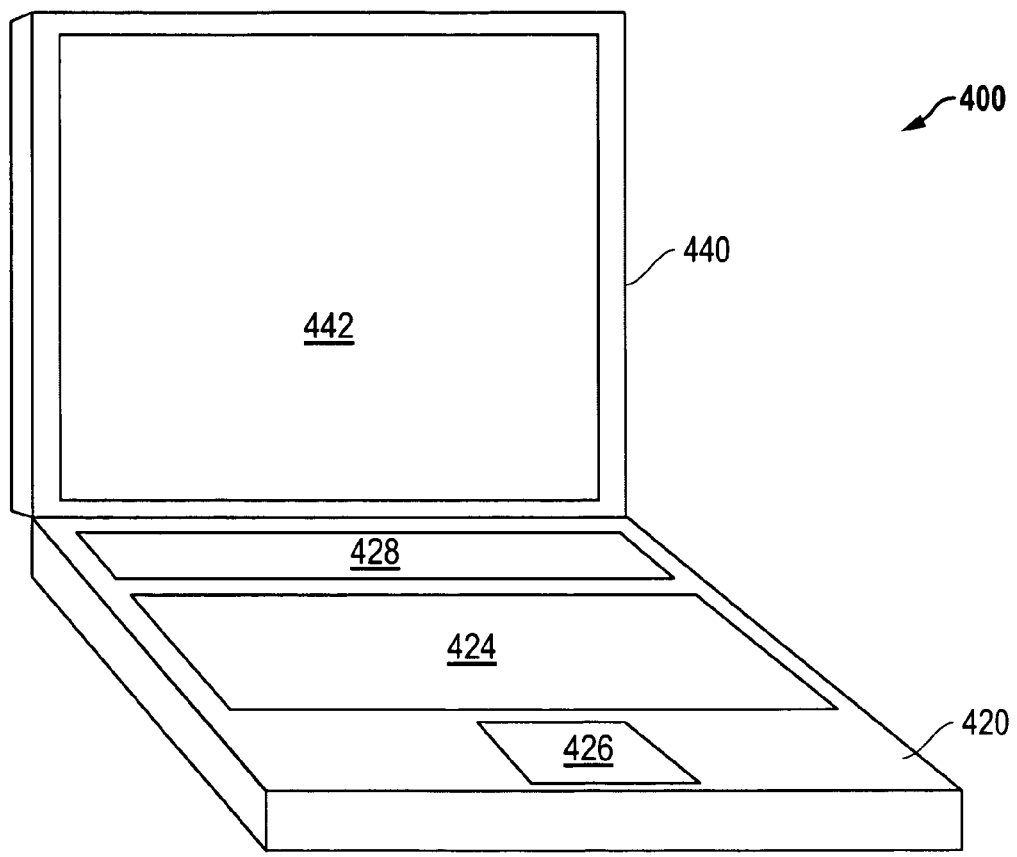
FIG. 3 includes an illustration of a perspective view of an exemplary information handing system.

FIG. 3 includes an illustration of a perspective view of an IHS 400 in the form of a laptop computer. The IHS 400 includes a base 420 and a lid 440 that has a display 442. The base 420 includes a keyboard 424, a touch pad 426, and a dashboard control panel 428. The configuration of the dashboard control panel 428 may vary depending on the needs or desires for a particular application. The dashboard control panel 428 can include a printed circuit board that is attached to the base 420 of the information handling system 400 regardless whether or not a cover for the dashboard control panel 428 is attached or removed from the remainder of the information handling system 400. A compressible member or a controlled air gap may be used to allow reproducible performance of the information handling system 400 after the cover has been removed and reattached or if a different cover is installed.

Figure 4:
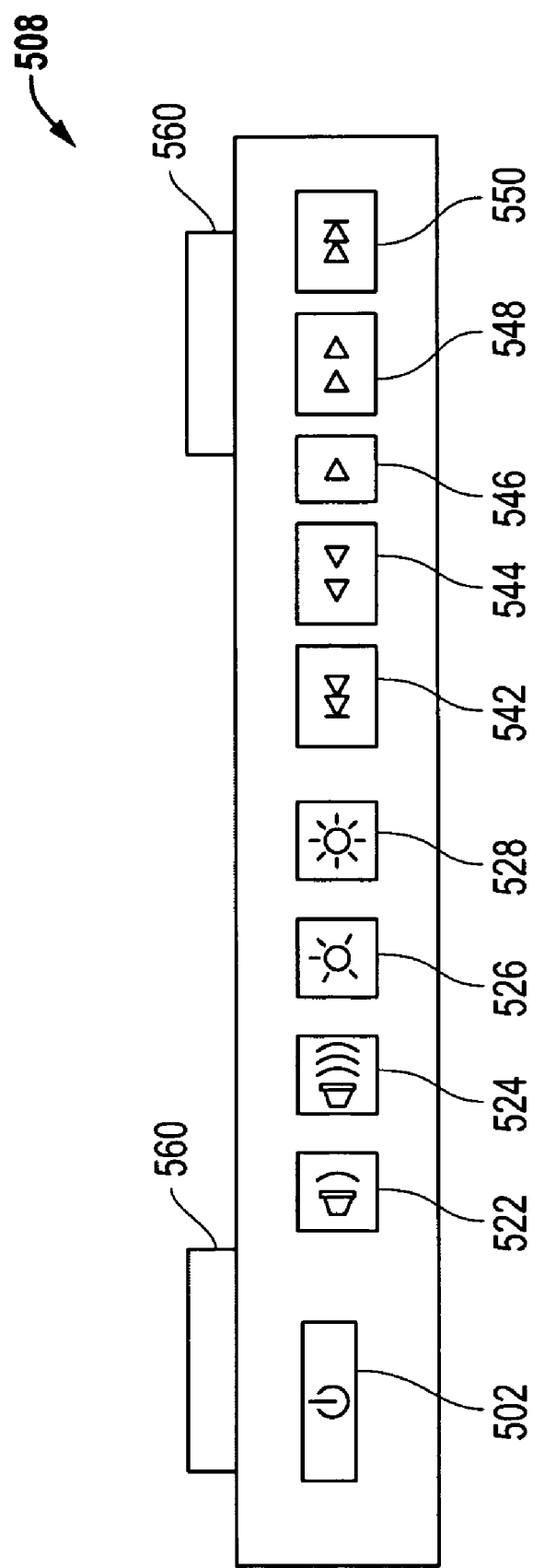
FIG. 4 includes an illustration of a top view of a dashboard control cover for the information handling system of FIG. 3.

In a set of embodiments, a compressible member may be used to help control the distance between a capacitive switch on a printed circuit board and a cover the dashboard control panel. FIG. 4 includes an illustration of a top view of a cover 508 of the dashboard control panel 428. The controls within the dashboard control panel 428 can include power 502 and other controls to allow a user to reduce volume 522, increase volume 524, reduce display brightness 526, increase display brightness 528, move to the beginning of a chapter or other section 542, rewind 544, play 546, fast forward 548, and move to the end of a chapter or other section 550. In another embodiment, more, fewer, or different controls (not illustrated) may be part of the dashboard control panel 428. Some or all of the controls can operate in conjunction with capacitive switches. In another embodiment, a mechanical switch can be used. In a particular embodiment, the control for power 502 can include a mechanical switch, and the rest of the controls of the dashboard control panel 428 can include capacitive switches. The dashboard control panel 428 also includes a pair of spaced-apart hinges 560. In another embodiment, the dashboard control panel 428 can include more, fewer, or no hinges.

Figure 5:
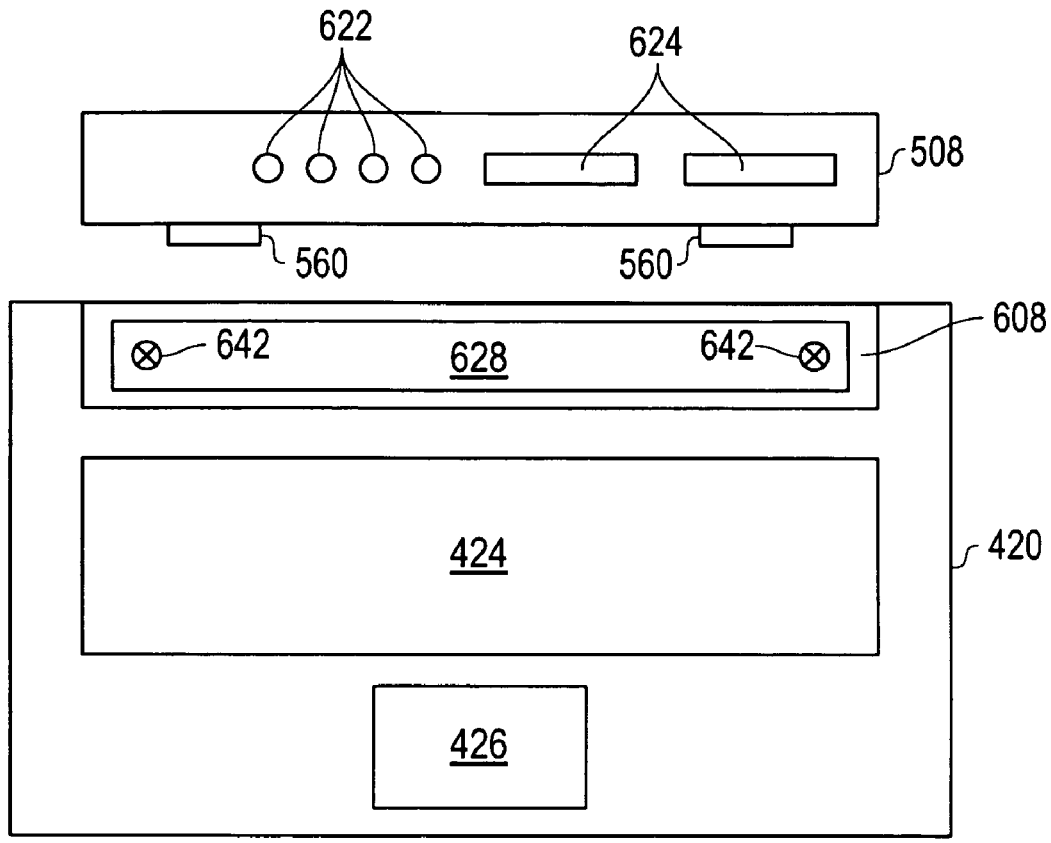
FIG. 5 includes an illustration of a base of the information handling system and a cover for the dashboard controls after the cover has been removed from the base.

FIG. 5 includes an illustration of a top view of the base 420 after removing the cover 508 of the dashboard control panel. When the cover 508 is removed, an opening 608 in the housing allows a printed circuit board 628 to become visible. The printed circuit board 628 can include capacitive switches. Unlike the printed circuit board 1262 in FIG. 1, the printed circuit board 628 in FIG. 5 is attached to the base 620 with fasteners 642, such as screws, clips, or the like. The printed circuit board 628 can be attached to the chassis, the housing, or another suitable portion of the base 620. Thus, the cover 508 can be removed without having to remove the printed circuit board 628 that includes wirings and electrical components of the dashboard controls. In a particular embodiment, the cover 508 does not include any electrical component and is not tethered to the base 420 by a flexible flat cable. Therefore, the cover 508 can be replaced and maintenance on the keyboard 424 or touch pad 426 may be performed without having to remove the printed circuit board 628 for the dashboard controls.

Figure 6:
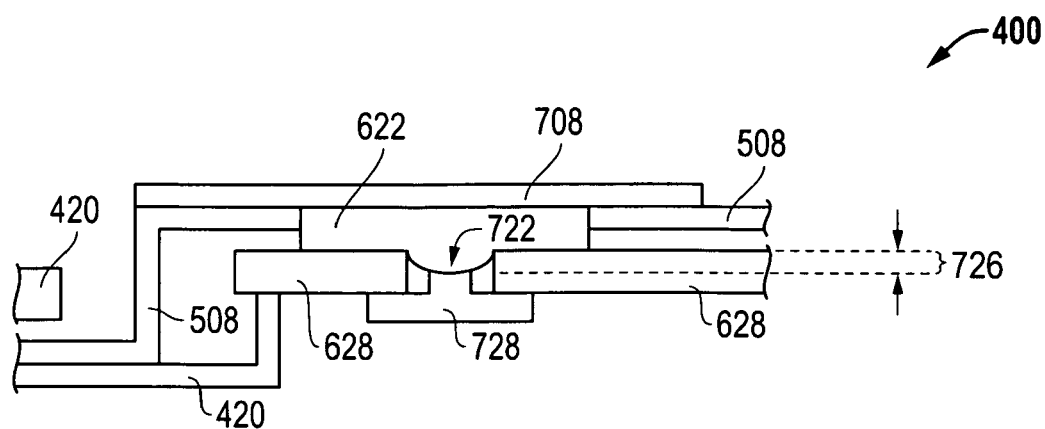
FIG. 6 includes an illustration of a side view of the base of the information handling system after the cover has been reattached to the base.

The bottom side of the cover 508 is illustrated in FIG. 6 and includes compressible members 622 and 624 that include a compressible material. When the cover 508 is attached to the base 420, the compressible members 622 and 624 abut the printed circuit board 628. The significance of the compressive members will become apparent when the configuration of the dashboard controls is described. In a particular embodiment, each compressible member 622 may correspond to a capacitive switch, and each compressible member 624 may correspond to more than one capacitive switch.

The compressible material of the compressible members 622 and 624 can include a rubber material, such as silicone rubber, a butadiene compound, or the like. Alternatively, the compressible material can include a gelatinous compound within a form-fitting container, such as silicone gel within a pliable plastic container. After reading this specification, skilled artisans will be able to select a particular compressible material that meets their needs or desires.

FIG. 6 includes an illustration of a cross-sectional view of a portion of the IHS 400 when the cover 508 is attached to the base 420. In the embodiment as illustrated, a film 708 overlies the cover 508. The film 708 may be printed with some or all of the icons as illustrated in FIG. 4. When the cover 508 is attached to the base 420, the compressible member 622 is compressed by a dimension 726. In an embodiment, the dimension 726 is no greater than 0.4 mm, and in a particular embodiment, the dimension 726 is in a range of approximately 0.1 to approximately 0.2 mm. The compressible member 622 includes a portion 722 that contacts a surface of a capacitive switch 728. The capacitive switch 728 is coupled to a trace of the printed circuit board 628. In this particular embodiment, no air gap is present between the top surface of the capacitive switch 728 and the film 708, as the compressible member 622 substantially fills the region between the two. Thus, the distance between the top surface of the capacitive switch 728 and the film 708 can be reproducibly made as the cover 508 is detached and reattached to the base 420, and allow for repeatable operation of the dashboard controls.

Figure 7:
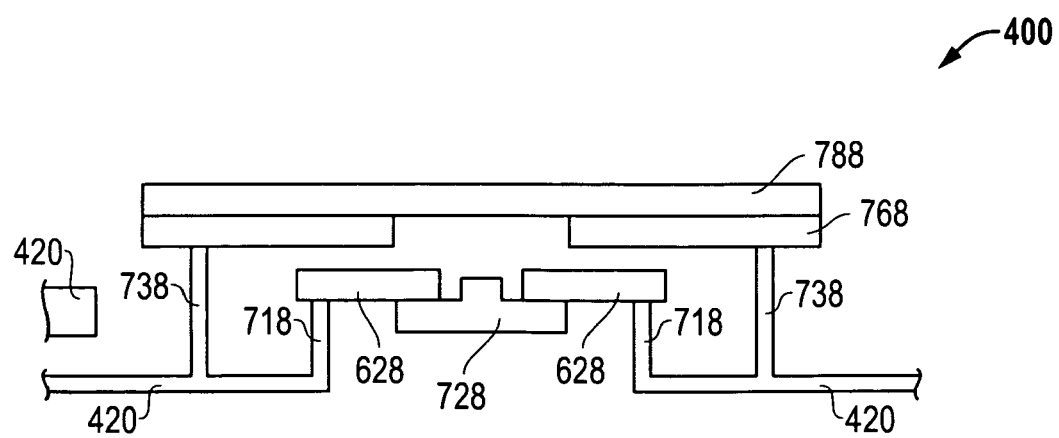
FIG. 7 includes an illustration of a side view of the base of the information handling system and the dashboard control panel to illustrate an embodiment without a compressive member between a printed circuit board and a cover of the dashboard control panel.

In another set of embodiments, no compressible member is used. Fasteners can be used to control the relative position between the printed circuit board and the cover of the dashboard control panel, which in turn controls the distance between a capacitive switch on a printed circuit board and a film overlying the cover the dashboard control panel. FIG. 7 includes an illustration of a cross-sectional view of a portion of the IHS 400 when a cover 768 is attached to the base 420. In the embodiment as illustrated, a film 788 overlies the cover 768. The film 788 may be printed with some or all of the icons as illustrated in FIG. 4.

In the embodiment as illustrated in FIG. 7, the printed circuit board 628 is attached to the base 420 at attachment points 718, and the cover 768 is attached to the base 420 at attachment points 738. The attachments between the base 420 and each of the printed circuit board 628 and the cover 768 can be in the form of snaps, screws, or other fasteners. As compared to the embodiments described with respect to FIGS. 5 and 6, the number of fasteners used may be greater in number to control more tightly an air gap between the cover 768 and the capacitive switch 728. The distance between the uppermost surface of the printed circuit board 628 and the bottom surface of the cover 768 will be the height difference between the attachment points 718 and 738, less the thickness of the printed circuit board 628. This distance can be in the range of the dimension 726 as previously described with respect to FIG. 6. The use of the attachment points 718 and 738 for securing the printed circuit board 628 and the cover 768 allows the distance between the top surface of the capacitive switch 728 and the film 788 to be reproducibly made as the cover 768 is detached and reattached to the base 420, and allow for repeatable operation of the dashboard controls.

In an alternative embodiment (not illustrated), the cover 768 in FIG. 7 could be attached to the printed circuit board 628, rather than to the base 420 at attachment points 738. Attachment points (not illustrated) between the cover 768 and the printed circuit board 628 can be different from the attachment points 718 between the printed circuit board 628 and the base 420. Alternatively, the attachment points can be altered so that the printed circuit board 628 and the cover 768 share the same attachment points, but still allow the cover 768 to be removed from the remainder of the information handling system 400 while the printed circuit board 628 remains attached to the base 420. After reading this specification, skilled artisans will appreciate that other embodiments can be devised and without deviating from the scope of the concepts described herein.

Figure 8:
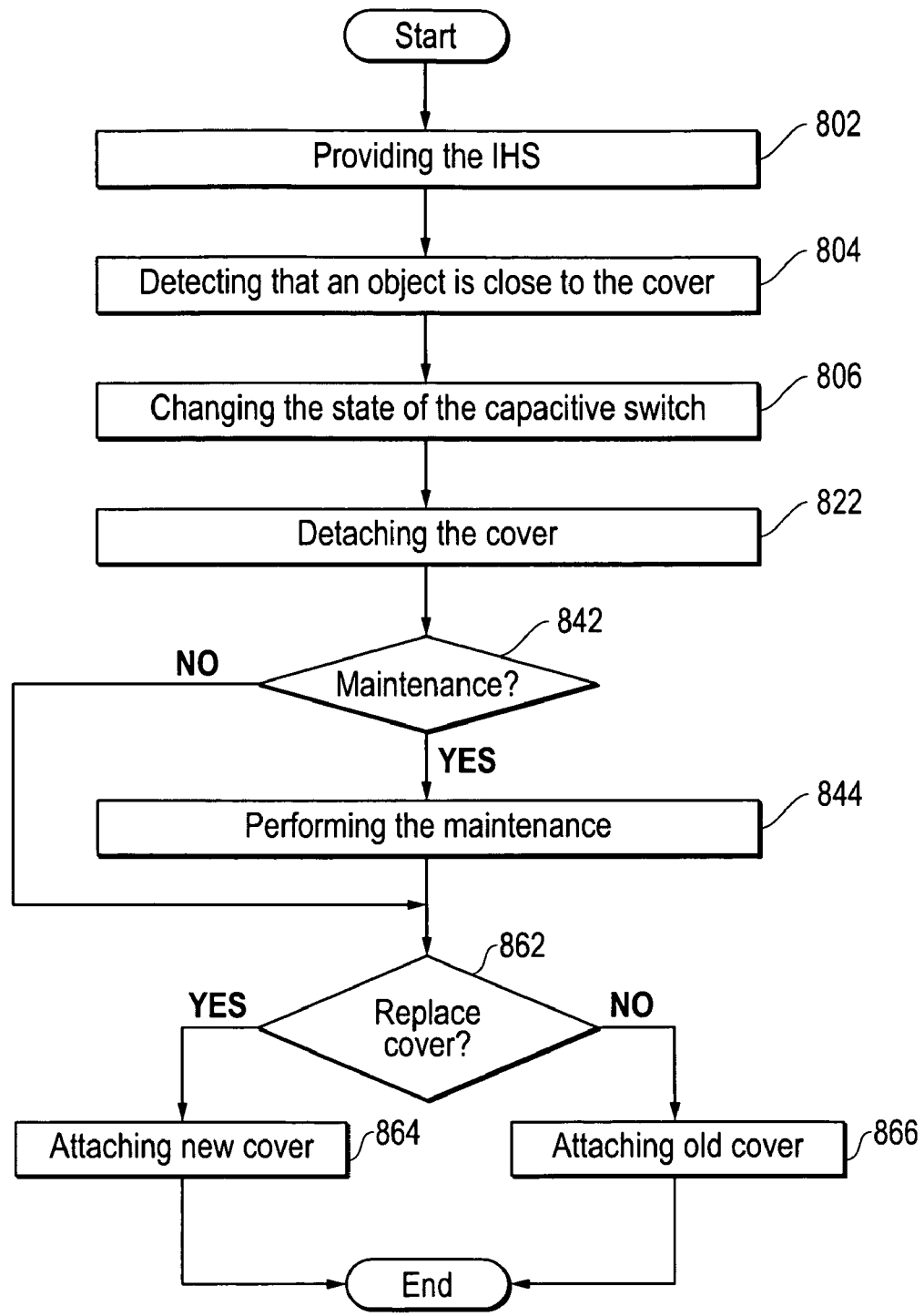
FIG. 8 includes a flow diagram of an exemplary method of using and maintaining the information handling system of FIG. 4.

FIG. 8 includes a flow diagram illustration for normal and maintenance operations of an IHS that incorporates dashboard controls as described herein. The method can include providing the IHS, at block 802. The IHS may be any of those IHSes that are described and illustrated herein. The method can also include detecting that an object is close to the cover, at block 804. The object may be a finger of a user, a pen or pencil, an eraser, or another object. In a particular embodiment, the object may not be detected until contact is made with the film 708, as illustrated in FIG. 7. The method can further include changing a state of the capacitive switch, at block 806. The state may change from active to deactivated, enabled to not enabled, open to close, high to low, on to off, 1 to 0, true to false, another suitable state change indication, or the reverse of any of the foregoing (e.g., deactivated to active, etc.). For example, if the user contacted the icon corresponding to the increasing brightness, the state of the switch changes, and a signal is generated and sent to the appropriate controller to increase the brightness of the display. As the object is moved away from the cover, the state may change back to its prior state or may stay in its current state (e.g., when the play icon is touched). The activities in blocks 802, 804, and 806 represent a normal operation of the IHS.

The IHS is particularly well suited for being able to be maintained and returned to a normal operating state after maintenance is performed. Continuing with FIG. 8, a determination is made whether maintenance is to be performed at decision tree 842. If yes, the method can include performing the maintenance, at block 844. The maintenance may require taking apart some of the base 420 to obtain access to the keyboard 424, the touch pad 426, or another portion of the base 420. The cover 508 of the dashboard controls can be taken off without having to necessarily remove the printed circuit board 628. Therefore, damage to the printed circuit board 628 or a flexible flat cable (not illustrated) coupled to the printed circuit board 628 is significantly reduced and may be substantially eliminated in some instances.

If there is no maintenance to be performed or after the maintenance is completed, a decision is made whether to replace the cover, at decision tree 862. The film 708 may have become scratched, the cover 508, a compressible member 622 or 624, or film 708 may have become damaged, or the film 708 or a compressive member 622 or 624 may have become detached from the cover 508. If the cover is to be replaced ("Yes" branch of decision tree 862, the method can include attaching the new cover, at block 864. Otherwise ("No" branch of decision tree 862), the method can include attaching the old cover at 866.

Embodiments as described herein allow for a better design of an information handling system that makes maintenance easier and warranty repairs less costly. The cover may not include any electrical components and not be tethered to the base by a flexible flat cable. Therefore, the cost of the cover is greatly reduced. If a cover would become scratched to damaged during a warranty period, the manufacturer would only send a new cover, which is less costly. Additionally, the likelihood of damage to the printed circuit board or the flexible flat cable for the dashboard controls are less likely to become damaged during maintenance of the keyboard, touch pad, or the another part of the base 420 of the IHS 400. The use of the compressible members can allow for a more repeatable distance between the film 708 and top surface of the sensor 728. Alternatively, attachment points 718 and 738 can be used to control the relative positions of the printed circuit board 628 and the cover 768. Thus, the reattachment or replacement of the cover can be performed without a significant risk of causing the dashboard controls to become inoperative.

Many different aspects and embodiments are possible. Some of those aspects and embodiments are described below. After reading this specification, skilled artisans will appreciate that those aspects and embodiments are only illustrative and do not limit the scope of the present invention.

In a first aspect, an information handling system can include a base, a printed circuit board including a capacitive switch, and a cover. The printed circuit board can be attached to the base, and the cover can be attached to the base and lie adjacent to the printed circuit board. The capacitive switch can be configured to change state when an object is close to the cover. The cover can be configured such that it can be detached from the base while the printed circuit board remains attached to the base.

In an embodiment of the first aspect, the information handling system further includes a compressible member lying between the cover and the capacitive switch. In a particular embodiment, the compressible member abuts the cover and the capacitive switch. In another particular embodiment, the compressible member is compressed by no more than approximately 0.4 mm when the cover is attached to the base, or the compressible member is compressed in a range of approximately 0.1 to approximately 0.2 mm when the cover is attached to the base. In still another particular embodiment, the compressible member includes silicon rubber or a gelatinous material.

In another embodiment of the first aspect, the base includes a housing of a portable information handling system, wherein the information handling system has a mass of no greater than approximately 4 Kg. In still another embodiment, the base includes a chassis of a portable information handling system, wherein the information handling system has a mass of no greater than approximately 4 Kg. In a further embodiment, the information handling system further includes a film overlying the cover. In still a further embodiment, the cover further includes a hinge. In yet a further embodiment, the cover does not include an electrical component.

In a second aspect, a method of using an information handling system can include providing the information handling system including a base, a printed circuit board including a capacitive switch, and a first cover. The printed circuit board can be attached to the base, and the first cover can be attached to the base and lying adjacent to the printed circuit board, and the first cover is configured such that it can be detached from the base while the printed circuit board remains attached to the base. The method can also include detecting that an object is close to the first cover, and changing a state of the capacitive switch in response to detecting the object is close to the first cover.

In an embodiment of the second aspect, the method further includes detaching the first cover from the base while the printed circuit board remains attached to the base. In a particular embodiment, the method further includes attaching a second cover onto the base while the printed circuit board remains attached to the base, wherein the second cover is different from the first cover. In another particular embodiment, the method further includes performing maintenance on a keyboard or a touch pad of the information handling system, and attaching the first cover onto the base. In a more particular embodiment, the printed circuit board remains attached to the base during detaching the first cover, performing maintenance, and attaching the first cover.

In a further particular embodiment of the second aspect, the method further includes attaching the first cover onto the base after detaching the cover, wherein during attaching the first cover, a compressive member lying between the first cover and the printed circuit board is compressed. In a more particular embodiment, the compressible member is compressed by no more than approximately 0.4 mm when the cover is attached to the base. In another more particular embodiment, the compressible member is compressed in a range of approximately 0.1 to approximately 0.2 mm when the cover is attached to the base.

After reading this specification, the functionality or performance of the methods described herein can be implemented in hardware, firmware, software, other machine-readable code, or any combination thereof. Further, methods described herein can be performed automatically; however, a portion of the method can be performed manually if needed or desired.

Note that not all of the activities described above in the general description or the examples are required, that a portion of a specific activity may not be required, and that one or more further activities may be performed in addition to those described. Still further, the order in which activities are listed are not necessarily the order in which they are performed.

In the description herein, a flow charted technique is described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described herein. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments and may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A portable information handling system comprising:
   a base including a keyboard, wherein the base has a volume defined by a top, a bottom, and peripheral walls;
   a printed circuit board including a capacitive switch, wherein the printed circuit board is attached to the base; and
   a cover hinged within an opening of the top of the base and lying adjacent to the printed circuit board, wherein:
   the capacitive switch is configured to change state when an object is close to the cover; and
   the cover is configured such that it can be detached from the opening of the top of the base and a remainder of the information handling system while the printed circuit board remains attached to the bottom of the base such that the printed circuit board is visible through the opening of the top of the base.

2. The information handling system of claim 1, wherein no compressible member is disposed between the cover and the capacitive switch.

3. The information handling system of claim 1, wherein the base comprises a housing of a portable information handling system, wherein the information handling system has a mass of no greater than approximately 4 Kg.

4. The information handling system of claim 1, wherein the base comprises a chassis of a portable information handling system, wherein the information handling system has a mass of no greater than approximately 4 Kg.

5. The information handling system of claim 1, further comprising a film overlying the cover.

6. The information handling system of claim 1, wherein the cover does not include an electrical component.

7. The information handling system of claim 1, further comprising a compressible member lying between the cover and the capacitive switch.

8. The information handling system of claim 7, wherein the compressible member abuts the cover and the capacitive switch.

9. The information handling system of claim 7, wherein the compressible member is compressed by no more than approximately 0.4 mm when the cover is attached to the base.

10. The information handling system of claim 7, wherein the compressible member is compressed in a range of approximately 0.1 to approximately 0.2 mm when the cover is attached to the base.

11. The information handling system of claim 7, wherein the compressible member comprises silicon rubber.

12. A method of using a portable information handling system comprising:
   providing the information handling system comprising a base having a volume defined by a top, a bottom, and peripheral walls and including a keyboard, a printed circuit board including a capacitive switch, and a first cover hinged within an opening of the top of the base, wherein:
   the printed circuit board is attached to the base; and
   the first cover lying adjacent to the printed circuit board, and the first cover is configured such that it can be detached from the opening of the top of the base and the a remainder of the information handling system while the printed circuit board remains attached to the bottom of the base such that the printed circuit board is visible through the opening of the top of the base;
   detecting that an object is close to the first cover; and
   changing a state of the capacitive switch in response to detecting the object is close to the first cover.

13. The method of claim 12, wherein no compressible member is disposed between the first cover and the capacitive switch.

14. The method of claim 12, further comprising detaching the first cover from the remainder of the information handling system while the printed circuit board remains attached to the base.

15. The method of claim 14, further comprising attaching a second cover onto the a remainder of the information handling system while the printed circuit board remains attached to the base, wherein the second cover is different from the first cover.

16. The method of claim 14, further comprising:
   performing maintenance on a keyboard or a touch pad of the information handling system; and
   attaching the first cover onto the remainder of the information handling system.

17. The method of claim 16, wherein the printed circuit board remains attached to the base during detaching the first cover, performing maintenance, and attaching the first cover.

18. The method of claim 14, further comprising attaching the first cover onto the remainder of the information handling system after detaching the first cover, wherein during attaching the first cover, a compressive member lying between the first cover and the printed circuit board is compressed.

19. The method of claim 18, wherein the compressible member is compressed by no more than approximately 0.4 mm when the first cover is attached to the base.

* * * * *